Patented Aug. 29, 1950

2,520,581

UNITED STATES PATENT OFFICE 2,520,581

PREPARATION OF MARSHMALLOW

John R. Turner, Fort Wayne, and Louis Sair, Decatur, Ind., assignors, by mesne assignments, to Soya Derivatives, Inc., Fort Wayne, Ind., a corporation of Indiana No Drawing. Application October 8, 1945, Serial No. 621,168

7 Claims. (Cl. 99—134)

1

This invention relates to the preparation of marshmallow and like products.

In the present practice, marshmallow is produced by whipping sugars and/or syrups with a whipping agent such as gelatin at temperatures at or above room temperature to produce a light, fluffy white emulsion of air in the syrup mixture. When gelatin is used, as is nearly always the case, the product has the following characteristics:

The marshmallow has a gelatinous nature probably due to the gel forming properties of the gelatin. On aging such material, as on a cookie base, the marshmallow progressively becomes more and more tough or rubbery. There also occurs a syneresis or exudation of liquid from within causing the appearance of liquid droplets on the surface of the piece. The above changes occur even when the cookie is coated or enrobed with a chocolate film. Ultimately, within thirty to sixty days, the marshmallow has become inedible due to the changes.

An object of the present invention is to provide a method for increasing the tenderness of the marshmallow at the time of manufacture and after a long period of storage. Another object is to provide a whipping mixture which will produce marshmallow in which there is substantially no syneresis or exudation of liquid on the surface of the piece. Yet another object is to provide a whipping material producing a marshmallow which is of greater volume and which handles better from a physical standpoint in machine used to deposit it on cookies. Yet another object is to provide a whipping mixture which produces a marshmallow product which shrinks less and which remains edible for a much longer period. Other specific objects and advantages will appear as the specification proceeds.

In the practice of our invention, the usual mixture of syrups, which may be natural syrups or syrups formed by the addition of sugar to water, with gelatin is employed. Before whipping, we add a soy protein or glycinin which has been modified to increase its water solubility. The modified product, through physical or chemical changes which we have not yet fully ascertained, produces a definite effect on the gelatin and syrup mixture with the result that the final marshmallow product is considerably more tender and no syneresis or exudation of liquid occurs on the surface of the piece. Further, the marshmallow product remains edible for a period at least fifty per cent more than that of the marshmallow formed without the addition of the protein. The new product has a greater volume and the volume does not shrink as when gelatin is used alone.

The modified soy protein or glycinin material for mixing with the syrup and gelatin may be formed by any suitable method. The application of John R. Turner, Serial No. 594,373, for Modified Soy Protein and the Preparation Thereof, now Patent No. 2,489,208, and the application of Louis Sair and James K. Gunther, Serial No. 595,472, for Modified Soy Protein and the Preparation Thereof, now abandoned, both set out satisfactory processes for production of such a protein or glycinin material.

In the first above-mentioned application, the treatment of the soy protein may be in a series of steps in which the glycinin is isolated from the other soy bean constituents and subjected to controlled modification. The steps may consist of the extraction of the protein in soluble form from soy bean material, the precipitation of the glycinin from the water soluble extract at or near the iso-electric pH range of the glycinin, the washing of the precipitated glycinin, the enzymatic modification of the glycinin, and heat treatment of the partially modified glycinin. If desired, the heat treatment may be omitted and the pH raised to inactivate the enzymes after the enzymatic step.

The modification is carried to the extent of rendering the modified glycinin substantially soluble in water at a pH of 5.0 or at least to the extent of 50% thereof. As a further product, the glycinin is modified until at least 30% of the modified glycinin is in the form of protein soluble in water at a pH of 5.0 and wherein between 25% and 45% of the nitrogen thereof is in the form of non-protein nitrogen in the water-soluble constituents of the product.

As a specific example of the process just described, the following is set out:

331 gms. of sodium sulphite (2% based on wt. of flakes) were added to 430 lbs. of water heated to 130° F. The pH of the solution was 7.8. 36 lbs. of solvent extracted soy bean flakes were added and the slurry was agitated for 1½ hrs. The pH of the slurry was 6.8. 10 lbs. of Celite 545 were then added and the slurry was then filtered through a Sperry filter press. The pH of the clear liquor (90° F.) was adjusted to 4.2 with sulphur dioxide, and after allowing 3 hours for settling, the supernatant liquid was decanted off. The card was given 2 washings with two fold volumes of water. The final solids in the curd was 13.2% and the yield of isolated protein based on the weight of the flakes was 24.6%.

50 lbs. of this curd were brought to a temperature of 100° F. and 15 gms. of pepsin were then added with moderate agitation followed by the addition of 10% hydrochloric acid, which brought the pH to 2.5. Enzymatic modification was continued for 1.5 hours and the temperature of the modified liquor was then raised to 160° F. and this temperature was held for ½ hour, and the liquor was then cooled to 90° F. and was neutralized to a pH of 6.5 with 10% caustic soda. The liquor was spray dried, using an inlet temperature of 370° F. and an outlet temperature of 170° F.

The product produced by this process contained 5.4% moisture, 11.7% ash, and 82.9% protein (N.x6.25). 68% of the total nitrogen was soluble in water at a pH of 5.0, and 28% of the nitrogen was present as non-protein nitrogen.

As an example of the process described in said above Sair and Gunther application, the following specific example is set out:

Sulfur dioxide is added to 430 lbs. of water heated to 105° F. until a pH of 4.2 is reached. 12 lbs. of flour and sulfur dioxide are then added simultaneously in such a manner as to maintain the pH within the range of 4.0–4.8. An additional 24 lbs. of flakes are then added, but in this case hydrochloric acid rather than sulfur dioxide is used for maintaining the pH between 4.0–4.5. The slurry is agitated for 1½ hrs. After allowing 6 hours for settling, the supernatant liquid was decanted off. The insoluble slurry was given a single washing with a ½ fold volume of water. The final solids in slurry was 14.3% and the yield of acid-leached insolubles based on the weight of the flakes 70.2%.

50 lbs. of the washed acid-leached flour was brought to a temperature of 100° F. and 13.6 gms. of pepsin were then added with moderate agitation, followed by the addition of 10% hydrochloric acid, which brought the pH to 2.7. Enzymatic modification was continued for 1.5 hours and the pH of the liquor was then immediately adjusted to 4.5 with 10% sodium hydroxide. Analyses showed that the modification had rendered 43.1% of the total glycinin soluble at a pH of 5.0 and that 12.1% of the glycinin was present in the form of non-protein nitrogen.

The modified liquor was then centrifuged to clarity, and the pH of the centrifugate was adjusted to 5.5, and the liquor was spray dried. Analyses of the dried powder showed that it contained 60% of soluble protein at a pH of 5.0 and that 93% of the total nitrogen was soluble at a pH of 5.0. The yield of dried whipping product based on the weight of original flour was 21.4%.

The product of the latter process is a modified glycinin having an excess of 40% of the nitrogen thereof in the form of water-soluble protein nitrogen, or a glycinin having between 40 and 65% of the nitrogen thereof in the form of water-soluble protein nitrogen. In such modified glycinin, 70% of the nitrogen thereof is in the constituents which are water-soluble at a pH of 5.0.

In determining the solubility of the product in water, the method outlined by A. K. Smith and S. J. Circle in Industrial and Engineering Chemistry 30, 1414–1418 (1938) for determining water-soluble nitrogen is used. In accordance with this procedure, one gram of the product is dispersed in 50 ml. of water and the pH of the suspension is then adjusted to 5. The suspension is then mechanically shaken for 30 minutes and the volume brought to 100 ml. in a volumetric flask. The suspension is centrifuged for 30 minutes at a temperature of 22°–26° C. at 2,000 R. P. M. (centrifuge radius 7.5 inches). The product remaining in the supernatant liquid is considered the water-soluble product, while that which is removed in the centrifuging is considered as water-insoluble. The term water-soluble as used herein is intended to refer to a product which remains in the supernatant liquid under these conditions.

The term protein or modified protein as used herein refers to a product which is precipitated by trichloroacetic acid under the following conditions: A one gram sample of the product is weighed into a 200 ml. centrifuge bottle and extracted with 40 ml. of 0.8 N. (13.6%) trichloroacetic acid for one-half hour in a mechanical shaker. The suspension is centrifuged for 15 minutes at 2,000 R. P. M. (centrifuge radius 7.5 inches). The supernatant liquid contains the non-protein fraction, which that portion of the product which is separated by the centrifuge is referred to as protein. This method of determination when applied to non-protein nitrogen is described by H. C. Becker, R. T. Milner, and B. H. Nagel, Cereal Chemistry 17, 447–457 (1940).

Water-soluble protein as referred to herein is that which is precipitated and separated by the Becker trichloroacetic acid test, but which remains in the supernatant liquid under the Smith centrifuging test at a pH of 5.0. Water-soluble nitrogen is determined by the Kjeldahl-Gunning-Arnold method on the product remaining in the supernatant liquid after the Smith centrifuge separation. Non-protein nitrogen is determined by the Kjeldahl-Gunning-Arnold method on the supernatant liquid remaining after the Becker trichloroacetic acid test.

In the forming of the whipping material, we prefer to mix the modified protein or glycinin with the syrup and gelatin so that the modified protein is from 10% to 30% of the resulting whipping mixture. Best results are obtained when the modified protein is between 20% and 30% of the whipping mixture.

As a specific example of the process, the following is set out:

440 grams of "Sweetose" corn syrup was placed in a laboratory size beater. To this was added a solution of 6 grams 225 Bloom Test gelatin,
2 grams soy protein or glycinin modified, as described in the examples given hereinbefore, and
50 grams water.

As a standard for comparison, the following process was carried through:

440 grams of "Sweetose" corn syrup was placed in a laboratory size beater. To this was added a solution of 8 grams 225 Bloom Test gelatin,
50 grams of water.

A comparison of the products produced from the two above examples showed:

1. The mix of the first example produces a greater volume in the same time of beating.

2. The marshmallow in the first example was very definitely more tender and remained more tender for a period double that of the product of the second example.

3. Upon aging the marshmallow frappe in quart sealers for one month, no separation of syrup occurred in the product of the first example, while in the second or "control" sample the frappe broke down completely, yielding a two-inch clear syrup liquor.

4. The product of the first example handled better from a physical standpoint in machines used to deposit it on cookies.

5. Once again there was no change in the tender nature of the marshmallow topping on the cookie of the first product for a much longer time.

6. The marshmallow topping of the first example did not shrink in volume as did the product of the second example.

7. There was no syneresis or surface liquid on the marshmallow topping of the first example.

8. The marshmallow cookie of the first example remained edible for a period of time double that of the second or "control" example.

While in the foregoing specific description and examples employed to illustrate the invention, we have set forth many details and specific steps, it will be understood that such details and steps may be modified widely by those skilled in the art without departing from the spirit of our invention and that the claims herein should be looked to as definitive of the scope of the invention.

We claim:

1. A whipping material for forming marshmallow, comprising syrup, gelatin and glycinin modified so that 40% of the nitrogen thereof is in the form of water-soluble protein nitrogen.

2. A whipping material for forming marshmallow, comprising syrup, gelatin and glycinin modified so that 40% of the nitrogen thereof is in the form of water-soluble protein nitrogen, and in which mixture the percentage of the glycinin is from 10 to 30% of the total mixture.

3. A whipping material for forming marshmallow, comprising syrup, gelatin and glycinin modified so that 40% of the nitrogen thereof is in the form of water-soluble protein nitrogen, and in which mixture the precentage of the glycinin is from 20 to 30% of the total mixture.

4. A whipping material for forming marshmallow, comprising syrup, gelatin and glycinin modified until at least 50% thereof is substantially soluble in water at a pH of 5.0.

5. A whipping material for forming marshmallow, comprising syrup, gelatin and glycinin modified to the extent that it is substantially soluble in water at a pH of 5.0.

6. In a step for preventing the exudation of liquid from marshmallow formed of syrup and gelatin, the step of adding to the syrup and gelatin before they are whipped a small percentage of glycinin modified until 40% of the nitrogen thereof is in the form of water-soluble protein nitrogen.

7. In a method for increasing the tenderness of marshmallow formed of syrup and gelatin and for increasing its edible life, the step of incorporating in the syrup and gelatin before whipping from 10 to 30% of glycinin modified until at least 50% thereof is soluble in water at a pH of 5.0.

JOHN R. TURNER.
LOUIS SAIR.

REFERENCES CITED

The following references are of record in the file of this patent:

UNITED STATES PATENTS

| Number | Name | Date |
|---|---|---|
| 1,643,950 | Leo | Oct. 4, 1927 |
| 2,171,244 | Otterbacher | Aug. 29, 1939 |
| 2,232,052 | Cummins | Feb. 18, 1941 |